United States Patent
Magalhaes et al.

(10) Patent No.: US 7,402,218 B2
(45) Date of Patent: Jul. 22, 2008

(54) PROCESS FOR THE WELDING OF TWO POLYAMIDE PARTS

(75) Inventors: Arminda M. L. Magalhaes, Maastricht (NL); Jeroen J. Crevecoeur, Maastricht (NL)

(73) Assignee: DSM IP Assets B.V., Heerlen (NL)

( * ) Notice: Subject to any disclaimer, the term of this patent is extended or adjusted under 35 U.S.C. 154(b) by 411 days.

(21) Appl. No.: 10/475,354

(22) PCT Filed: Apr. 26, 2002

(86) PCT No.: PCT/NL02/00282

§ 371 (c)(1),
(2), (4) Date: Apr. 7, 2004

(87) PCT Pub. No.: WO02/090425

PCT Pub. Date: Nov. 14, 2002

(65) Prior Publication Data

US 2004/0157023 A1 Aug. 12, 2004

(30) Foreign Application Priority Data

May 4, 2001 (EP) .................................. 01201650

(51) Int. Cl.
*B32B 37/00* (2006.01)
(52) U.S. Cl. .................................... 156/73.5; 156/272.8
(58) Field of Classification Search ................ 156/73.1, 156/73.5, 272.2, 272.8
See application file for complete search history.

(56) References Cited

U.S. PATENT DOCUMENTS 6,334,615 B1 1/2002 Uchiyama et al.

FOREIGN PATENT DOCUMENTS

| DE | 198 11 885 | | 11/1998 |
|---|---|---|---|
| JP | 8118474 | * | 5/1996 |
| JP | 10204286 A | | 8/1998 |
| WO | 98 11164 | | 3/1998 |
| WO | 98 41398 | | 9/1998 |

OTHER PUBLICATIONS

Chemical Abstract Service, Urabe et al., No. 126: 75910,; English abstract of JP 08 281827.
Chemical Abstract Service, Nakajima et al., No. 129: 331563; English abstrct of JP 10 292108.
Crevecoeur et al; "Chain Branching Agent and Polyamide Composition Containing the Same"; U.S. Appl. No. 10/469,797, filed Sep. 4, 2003.

* cited by examiner

*Primary Examiner*—James Sells
(74) *Attorney, Agent, or Firm*—Nixon & Vanderhye P.C.

(57) ABSTRACT

A process for the welding of two polyamide parts, both made of a polyamide composition comprising a polyamide and optionally additives, the polyamide of one part (part L) having a lower softening temperature than the polyamide of the other part (part H), and wherein the polyamide composition of part L comprises one or more viscosity increasing additives increasing the melt shear viscosity of the polyamide composition at least by 30% compared to melt shear viscosity of the polyamide (measured according to ISO 11443 (A1) standard at a shear rate of 100 $s^{-1}$ in a capillary rheometer with I/d =30 mm/1 mm). A good weld strength is obtained and parts with different properties can be combined. Polyamide welded objects such as corrugated tubes, bellows, containers, fuel inlet systems, air inlet manifolds and airducts, may be obtained.

29 Claims, No Drawings

PROCESS FOR THE WELDING OF TWO POLYAMIDE PARTS

CROSS REFERENCE TO RELATED APPLICATION

This application is the National Phase of International Application PCT/NL02/00282 filed Apr. 26, 2002 which designated the U.S., and that International Application was published under PCT Article 21(2) in English.

The invention relates to a process for the welding of two polyamide parts, both made of a polyamide composition comprising a polyamide and optionally additives. The invention further relates to polyamide welded objects obtainable by the process, like corrugated tubes, bellows, containers, fuel inlet systems, air inlet manifolds and airducts.

In WO 98/11164 it is described that two polyamide parts can be welded together by vibration welding. In the two polyamide parts the polyamide component is the same.

The inventors found that considerable practical advantages can be realized in a polyamide welded object comprising two polyamide parts welded together, both parts being made of a polyamide composition comprising a polyamide and optionally additives, the polyamide of one part (part L) having a lower softening temperature than the polyamide of the other part (part H). With softening temperature is here and hereafter meant the melting temperature for crystalline polymers or the glass transition temperature for amorphous polymers. The advantage of such a dissimilar polyamide welded object is that the properties of the object as a whole can further be optimised by using in the object different polyamide materials at places where different material properties are required. For example, in automotive under the bonnet applications, where both very high temperature resistance requirements and high flexibility requirements exist, the object may be build up by welding together a heat resistant polyamide, where heat resistance is required, and a flexible polyamide where flexibility, but no high heat resistance is required. The object performs better and/or can be made cheaper.

It is however generally considered that, in order to obtain a weld of sufficient strength, it is necessary that the polyamide in the two parts to be welded has to be the same. The main reasons for this are believed to be that dissimilar polyamides would show poor interaction and adhesion and that for vibration welding the higher melting part will not or hardly melt and no sufficient weld strength is obtained.

It is the object of the invention to provide a process for welding two polyamide parts, the polyamide of one part (part L) having a lower softening temperature than the polyamide of the other part (part H). This object is according to the process of the invention achieved in that the polyamide composition of part L comprises one or more viscosity increasing additives increasing the melt shear viscosity of the polyamide composition at least by 30% compared to the melt shear viscosity of the neat polyamide (measured according to ISO 11443 (A1) standard at a shear rate of 100 s$^{-1}$ in a capillary rheometer with I/d=30 mm/1 mm). For the measurement of this increase in melt shear viscosity, the exact temperature of measurement is not very critical as long as the measurement and comparison of the viscosity of both the polyamide and the polyamide composition are done at the same temperature. Nevertheless it is preferred that the melt shear viscosity is measured at a normal standard melt processing temperature of the polyamide, in particular for polyamide-6 at 260° C. and for polyamide-6,6 at 280° C.

It was surprisingly found that with the process according to the invention, acceptable weld strength could be obtained, as described in the experiments. In view of obtaining a better weld strength in the process according to the invention, the melt shear viscosity at 100 s$^{-1}$ of the polyamide composition of part L is increased at least 50%, preferably at least 70% and most preferably at least 100%.

It was found, in particular for polyamide-6 and polyamide-6,6, that good weld strength could be obtained if in the process according to the invention, the melt shear viscosity of the polyamide composition of part L is at least 200 Pa.s, preferably at least 250 Pa.s, most preferably at least 300 Pa.s.

It was found that good weld strength could be obtained also by using a high molecular weight polyamide in part L. A high molecular weight polyamide is considered a polyamide with a relative solution viscosity of at least 2.4. The polyamide relative solution viscosity is determined from a solution of 1 gram/100 ml in 90% formic acid at 25° C. A relative solution viscosity of at least 2.4 is considered high for moulded parts, because these viscosities are normally used only for fiber, film or blow moulding. Put differently, good weld strength results are obtained by using a fiber, film or blow-moulding grade in the moulded part L. Hence, in a preferred embodiment, the invention relates to a process for the welding of polyamide parts, with the polyamide of one part (part L) having a lower softening temperature than the polyamide of the other part (part H), wherein the polyamide composition of part L comprises a high molecular weight polyamide and/or viscosity increasing additives and the polyamide composition of part L has a melt shear viscosity of at least 200 Pa.s, preferably at least 300 Pa.s.

Preferably, the polyamide composition in part L comprises polyamide having a relative solution viscosity between 2.0 and 4, in particular between 2.4 and 4, and viscosity increasing additives. A relative solution viscosity above 2 results in better weldability, whereas the relative solution viscosity preferably is less than 4 because of processability reasons. A relative solution viscosity above 2.4 gives better weld strength as explained above.

The combination of higher molecular weight polyamide with additives has significant unexpected improvement, considered to be due to be due to higher free end group concentration. Generally higher molecular weight polyamide requires less chain-stopper to obtain a stable polymer and the intrinsic higher number of end-groups results in better interaction with other ingredients. Suitable polyamides have in general 0.1 to 1 amine groups as end-groups per linear chain molecule; preferably the content of amine groups is at least 20 meq/kg and most preferably at least 40 meq/kg. The advantage of a higher amine group content is a larger increase of the viscosity and more pronounced non-Newtonian melt flow behaviour by reaction of anhydride groups in the branching agent.

In principle, any combination of dissimilar polyamides can be chosen to combine intrinsically properties like high temperature resistance and flexibility. Combinations of such polyamides are for example polyamide-6/ polyamide-6,6; polyamide-6/ polyamide-4,6, polyamide-6,6/ polyamide-4,6, polyamide 4,6/ semi-aromatic polyamide etc. Preferably, the polyamide of part H has a softening temperature above 280° C. and the polyamide of part L has a softening temperature below 270° C. Heat resistance often goes along with rigidity and low flexibility, whereas high flexibility often goes along with low heat resistance. The combination of a part with a polyamide with softening temperature above 280° C. and a part with a the polyamide with a softening temperature below 270° C. has the advantage that it combines high heat resistance and flexibility.

A preferred embodiment of a polyamide of part H with softening temperature above 280° C. is chosen from the group of polyamide-4,6 and semi-aromatic (co-)polyamides like polyamide (6,6/6,T/6,I), polyamide (6,T/4,T). These polyamides have good heat stability and mechanical properties.

Most preferred is that the polyamide of part H is polyamide-4,6. Polyamide-4,6 is a polyamide well appreciated for its performance in engineering plastics in high temperature applications and polyamide-4,6 is widely used polyamide, well available, moderately priced with good flexibility properties.

The polyamide of part L with a softening point below 270° C. is chosen from aliphatic polyamides polyamide-6,6, polyamide-6, polyamide-4,10, polyamide-4,12 and any copolymers of these. Preferably the polyamide is chosen from polyamide-6 or polyamide-6/6,6 copolymer.

The most preferred combination of a polyamide with softening temperature above 280° C. and a the polyamide with a softening temperature below 270° C. is the combination of polyamide-4,6 with polyamide-6. The advantage of this combination is, that parts made of these polyamides show the best weld strength in welding of dissimilar polyamide parts.

In another embodiment of the process according to the invention, the polyamide composition of part L comprises one or more viscosity increasing additives chosen from the group of fibres, chain extenders, branching agents and nanofillers. The advantage is that good welding behaviour can be obtained in combination with viscoelastic properties, which can be varied over a wide range.

The polyamide composition of part L comprises, as a viscosity increasing additive, at least 10, preferably 20, more preferably 30 and most preferably at least 40 w % fibres. The advantage is that better welding behaviour can be obtained in combination with good mechanical strength, which becomes even better with the higher fiber content. Many fibres are suitable, like glass fibres, carbon fibres, whiskers etc. Preferably, the fiber is glass fiber, because glass fiber is very well suited to improve the welding strength, it is strong and it is cheap.

Preferably, the fiber has an aspect ratio L/d of at least 20. The advantage is that a fiber with an aspect ratio L/d of at least 20 has a higher viscosity increase per unit mass than fibers with a lower aspect ratio L/d.

In another embodiment of the process according to the invention, the polyamide composition of part L comprises, as a viscosity increasing additive, a branching agent that reacts with the polyamide giving the polyamide composition a non-Newtonian melt flow behaviour. Non-Newtonian melt flow behaviour is here understood as the rheologic behaviour of a molten polymer composition wherein the melt shear viscosity of the molten polymer composition increases with decreasing shear rate. Preferably, the branching agent is combined with a polyamide with relative solution viscosity of more than 2.4 and/or end group concentration of more than 20 meq/kg. Preferably such a branching agent is used in combination with glass fibres, yielding rigid products with a very good weld strength.

A suitable branching agent is an anhydride containing copolymer, preferably a copolymer of maleic anhydride and styrene. With anhydride containing polymer is understood a polymer containing anhydride groups or other groups, like dicarboxylic acid groups, which groups can form anhydride groups under the polymer processing conditions.

Better weld strength is obtained when the branching agent comprises a) a copolymer of at least an unsaturated dicarboxylic acid or a derivative thereof and a vinylaromatic monomer, preferably styrene maleic anhydride copolymer (SMA), and b) a copolymer of acrylonitril and a vinylaromatic monomer, preferably styrene-acrylonitril copolymer (SMA) wherein (a) and (b) are miscible and the ratio (a)/(b) is between 1/3 to 3/1. The advantage is that such a branching agent gives less gel formation and yields more homogeneous properties.

In an alternative embodiment of the process according to the invention, the polyamide composition of part L comprises, as viscosity increasing additive, a chain extender, such as carbonylbisimidazol or carbonylbislactamate. The advantage is that due to in-situ reaction higher molecular weights are achievable in the end-product than normally can be used under standard processing conditions. Preferably the chain extender is carbonylbislactamate, more preferably carbonylbiscaprolactamate. The advantage is that these chain extenders give better properties in the end-product.

The invention in particular relates to a process according to the invention, wherein the welding is done by laser welding, vibration welding or hot plate welding, preferably vibration welding. The advantages of the process according to the invention are present in particular in case the welding is done by vibration welding.

The invention also relates to polyamide welded objects obtainable according to the process of the invention as described above. Such welded objects show a good weld strength. Preferably the weld strength is at least 20 MPa, more preferably 40 MPa, most preferably 60 MPa. Preferably the weld strength is at least 30% of the bulk strength of the composition of Part L, more preferably at least 40% and most preferably at least 50% of the bulk strength of the composition of Part L.

The invention further relates to polyamide welded object comprising two polyamide parts welded together both parts being made of a polyamide composition comprising a polyamide and optionally additives, the polyamide of one part (part L) having a lower softening temperature than the polyamide of the other part (part H), wherein the polyamide composition of part L comprises a high molecular weight polyamide and/or viscosity increasing additives. The advantage of such welded object is that it combines high temperature resistance and good flexibility together with a good weld strength.

A preferred embodiment is constituted by a polyamide welded object wherein the polyamide composition of part L has a melt shear viscosity of at least 200 Pa.s, preferably at least 300 Pa.s. Such a polyamide welded object exhibits significant weld strength.

The invention also relates to the process for the manufacturing of a polyamide welded object wherein the welding is done by laser welding, vibration welding or hot plate welding, preferably vibration welding.

The invention furthermore relates to corrugated tubes, bellows, containers, fuel inlet systems, air inlet manifolds, airducts manufactured with to the process according to the invention.

The invention is further illustrated with the following examples and comparative experiments.

Materials Used

SMA a styrene-maleic anhydride copolymer with a maleic anhydride content of 28 mass % (type Stapron® SZ28110, DSM, NL);

SAN a styrene-acrylonitril copolymer with a AN-content of 28 mass %, MFI (220° C., 10 kg) 50 g/10 min (DSM, NL);

LDPE a low-density polyethylene (type Lupolen® 1810H, BASF, DE);

PA-6-I polyamide-6, $\eta_{rel}$=2.2 (measured at 1 mass % in formic acid, 25°) (type Akulon® K122, DSM, NL); melt shear viscosity 140 Pa.s at 100 s$^{-1}$ and 260° C.

PA-6-II polyamide-6, $\eta_{rel}$=2.5 (measured at 1 mass % in formic acid, 25°) (type Akulon® C225, DSM, NL); melt shear viscosity 200 Pa.s at 100 s$^{-1}$ and 260° C.

PA-4,6 polyamide-4,6 (type Stanyl® TW 200; DSM, NL);

GF-I standard polyamide glass fiber used in polyamde-6 (type OCF CS 173X-10C; Owens Corning);

GF-II standard polyamide glass fiber used in polyamide-4,6 (type OCF R 73WX1; Owens Corning).

Preparation of Branching Agent

A mixture of SMA/SAN/LDPE, with a mass ratio of 25/25/50 was extruded on an extruder type ZSK 57, with a temperature setting at 230° C. and a rotation speed of 200 rpm. The throughput was 110 kg/hour, controlled by the momentum at 85%. The mixture was easily extruded and cut into regular granules.

Preparation of Polyamide Composition

PA-6-1-GF

The 30 wt % glass fiber reinforced PA-6-1-GF was compounded from PA-6-1 and GF-I in an double-screw extruder type ZSK 30 at a barrel temperature of 260° C., screw speed 250 rpm. The composition had a shear viscosity of 300 Pa.s at a shear rate of 100 s$^{-1}$ and 260° C.

PA-6-2-GF

The 30 wt % glass fiber reinforced PA-6-2-GF was compounded from PA-6-2 and GF-I at the same conditions as PA-6-1-GF. The composition had a melt shear viscosity of 500 Pa.s at a shear rate of 100 s$^{-1}$ and 260° C.

PA-6-2-BA-GF

The composition of polyamide-6 modified with 2.7 mass % branching agent and reinforced with 30 mass % glass fibre PA-6-2-BA-GF was made by compounding PA-6-2, the branching agent SMA/SAN/LDPE (mass ratio 25/25/50, described above), regular processing aids and stabilisers and glass fibre GF-1 on a ZSK30 twin-screw extruder. The temperature was controlled at 270° C., the throughput was about 10 kg/hour. The composition had a shear viscosity of 1130 Pa.s at a shear rate of 100 s$^{-1}$ and 260° C.

PA4,6-GF

The 30 wt % glass fiber reinforced PA4,6-GF was compounded from PA-4,6 and GF-II in a ZSK 25 extruder at a barrel temperature of 300° C., screw speed 275 rpm (throughput 20 Kg/h).

Melt Shear Viscosity Measurements

The melt shear viscosity of the polyamide and polyamide compositions was measured according to ISO 11443 (A1) standard at a shear rate of 10 s$^{-1}$ in a capillary rheometer with I/d=30 mm/1 mm. For polyamide-6, the measurements were done at 260° C., for polyamide-6,6 at 280° C.

Injection Moulding

For all the tested materials, plates of dimensions 120 mm×120 mm×4 mm were injection moulded according to the following conditions Injection Moulding of Polyamide-6 Materials Injection moulding of the polyamide-6 materials PA-6-1, PA-6-2, PA-6-GF, PA-6-2-GF and PA-6-2-BAN-GF was performed on a KM 120 injection-moulding machine with barrel temperature settings 230-260° C. and a mould temperature of 80° C.

Injection Moulding of Polyamide-4,6 Materials

Injection moulding of the polyamide-4,6 materials PA-4,6 and PA-4,6-GF was performed on a KM 120 injection-moulding machine with barrel temperature settings 300-310° C. and a mould temperature of 120° C. was used.

Vibration Welding

The welding tests were done on a Bielomatik (Neuffen, Germany) vibration-welding machine, Type K3210. The welding parameters were as follows: frequency: 240 Hz; amplitude: 0.9 mm; weld pressure: 2 Mpa; weld time: 4 s; hold time: 7 s. The process was time controlled to yield an estimated weld depth of 1.8 mm. For each material-combination, 5 weldings were executed.

For the purpose of the welding tests, the injection-moulded parts were cut in half along the 120 mm width. The butt-welded samples were oriented in the tool such that the 120 mm×4 mm surface became the weld area. Welding occurred on molded surfaces to more adequately represent an industrial welding process. Vibration was parallel to the 120 mm plate width.

Tensile Testing

The butt-welded samples were cut into 10 mm wide tensile specimens and loaded on a Zwick testing machine until fracture at a crosshead speed of 10 mm/min. The tensile strength was obtained by the force at failure normalized by the weld area, being 4 mm×10 mm. The strain was measured with an extensiometer and established as the macroscopic strain at break; the real strain can be much higher in many cases. The values listed are averaged over five specimens. The relative weld strength $f_s^* = \sigma_{weld}/\sigma_{bulk}$ is the ratio of the strength of the weld to the strength of the polyamide-6 composition used in the specific combination.

EXAMPLES AND COMPARATIVE EXPERIMENT

Vibration welding according the above-described method was done for the combinations of materials listed in Table I. Tensile tests were performed on these welded materials according above methods. The test results are reported in Table I.

TABLE I

Heterogeneous weldings of Polyamide-6 compositions to Polyamide-4,6-composition and tensile test results

| Experiments/Examples | Materials | σ-max [MPa] | ε at σ-max [%] | $f_r^*$ $\sigma_{weld}/\sigma_{bulk}$ |
|---|---|---|---|---|
| Comparative Experiment A | PA-6-1 PA-4,6 | — | No weld | — |
| Example I | PA-6-2 PA-4,6 | 20 | 0.7 | 0.32 |
| Example II | PA-6-1-GF PA-4,6-GF | 53 | 1.0 | 0.43 |
| Example III | PA-6-2-GF PA-4,6-GF | 60 | 1.3 | 0.48 |
| Example IV | PA-6-2-BA-GF PA-4,6-GF | 63 | 1.5 | 0.58 |

*$f_r$: relative weld strength, referred to the Polyamide-6 composition

The invention claimed is:

1. Process for the manufacture of a polyamide welded object by laser welding, vibration welding or hot plate welding, preferably by vibration welding two polyamide parts, both made of a polyamide composition comprising a polyamide and optionally additives, the polyamide of one part (part L) having a lower softening temperature than the polyamide of the other part (part H), wherein the polyamide composition of part L comprises one or more viscosity increasing additives increasing the melt shear viscosity of the polyamide composition at least by 30% compared to melt shear viscosity of the polyamide (measured according to ISO 11443 (A1) standard at a shear rate of 100 s$^{-1}$ in a capillary rheometer with I/d=30 mm/1 mm).

2. Process according to claim 1, wherein the melt shear viscosity of he polyamide composition of part L is increased at least 50%.

3. Process according to claim 1, wherein the melt shear viscosity of the polyamide composition of part L is at least 200 Pa.s.

4. Process according to claim 1, wherein the polyamide composition of part L comprises a high molecular weight polyamide and viscosity increasing additives such that the polyamide composition of part L has a melt shear viscosity of at least 200 Pa.s at 100 s$^{-1}$.

5. Process according to claim 1, wherein the polyamide composition in part L comprises polyamide having a relative solution viscosity between 2.0 and 4 and viscosity increasing additives, which relative solution is determined from a solution of 1 gram/100 ml in 90% formic acid at 25° C.

6. Process according to claim 1, wherein the polyamide of part H has a softening temperature above 280° C. and the polyamide of part L has a softening temperature below 270° C.

7. Process according to claim 6, wherein the polyamide of part H is at least one selected from the group consisting of polyamide-4,6 and semi-aromatic (co-)polyamides.

8. Process according to claim 1, wherein the polyamide of part H is polyamide-4,6 and the polyamide of part L is polyamide-6.

9. Process according to claim 1, wherein the polyamide composition of part L comprises one or more viscosity increasing additives selected from the group consisting of fibers, chain extenders, branching agents and nano-fillers.

10. Process according to claim 9, wherein the polyamide composition of part L comprises, as a viscosity increasing additive, at least 10 w % fibers.

11. Process according to claim 10, wherein the fibers comprise glass fibers.

12. Process according to claim 10, wherein the fibers have an aspect ratio L/d of at least 20.

13. Process according to claim 1, wherein the polyamide composition of part L comprises, as viscosity increasing additive, a branching agent that reacts with the polyamide giving the polyamide composition a non-Newtonian melt flow behaviour.

14. Process according to claim 13, wherein the branching agent is an anhydride containing copolymer.

15. Process according to claim 13, wherein the branching agent comprises a) a copolymer of at least an unsaturated dicarboxylic acid or a derivative thereof and a vinylaromatic monomer and b) a copolymer of acrylonitrile and a vinylaromatic monomer wherein (a) and (b) are miscible and the ratio (a)/(b) is between 1/3 to 3.

16. Process according to claim 1, wherein the polyamide composition of part L comprises, as a viscosity increasing additive, a chain extender.

17. Process according to claim 1, wherein the welding is done by vibration welding.

18. Process according to claim 1, wherein the melt shear viscosity of he polyamide composition of part L is increased at least 70%.

19. Process according to claim 1, wherein the melt shear viscosity of he polyamide composition of part L is increased at least 100%.

20. Process according to claim 1, wherein the melt shear viscosity of the polyamide composition of part L is at least 300 Pa.s.

21. Process according to claim 4, wherein the melt shear viscosity of the polyamide composition of part L is at least 300 Pa.s.

22. Process according to claim 5, wherein the polyamide composition in part L comprises polyamide having a relative solution viscosity between 2.4 and 4.

23. Process according to claim 7, wherein the polyamide of part H is polyamide (6,6/6,T/6,1) and/or polyamide (6,T/4,T).

24. Process according to claim 10, wherein the polyamide composition of part L comprises at least 20 w % fibers.

25. Process according to claim 10, wherein the polyamide composition of part L comprises at least 30 w % fibers.

26. Process according to claim 10, wherein the polyamide composition of part L comprises at least 40 w % fibers.

27. Process according to claim 14, wherein the anhydride containing copolymer is a copolymer of maleic anhydride and styrene.

28. Process according to claim 15, wherein the branching agent comprising comprises a styrene maleic anhydride copolymer (SMA) and a styrene-acrylonitril copolymer (SAN).

29. Process according to claim 16, wherein the chain extender comprises carbonylbislactamate.

* * * * *